(No Model.)

W. HOLZER.
INCANDESCENT ELECTRIC LAMP.

No. 305,191. Patented Sept. 16, 1884.

ATTEST:
E. C. Rowlands
N. W. Seeley

INVENTOR:
William Holzer,
By Rich'd N. Dyer,
Atty.

UNITED STATES PATENT OFFICE.

WILLIAM HOLZER, OF HARRISON, NEW JERSEY, ASSIGNOR, BY MESNE ASSIGNMENTS, TO THE EDISON LAMP COMPANY, OF SAME PLACE.

INCANDESCENT ELECTRIC LAMP.

SPECIFICATION forming part of Letters Patent No. 305,191, dated September 16, 1884.

Application filed March 30, 1883. (No model.)

*To all whom it may concern:*

Be it known that I, WILLIAM HOLZER, of Harrison, in the county of Hudson and State of New Jersey, have invented a certain new and useful Improvement in Electric Lamps and the Manufacture thereof, of which the following is a specification.

The object of this invention is to provide a secure and durable seal at the points where the leading-in wires of an incandescent electric lamp pass through the glass of such lamp, and also in some cases to diminish the amount of metal within the inclosing-globes of such lamps.

I have heretofore in the manufacture of incandescing electric lamps softened the upper end of the glass tube having the leading-in wires laid within it, which is to form the inner stem of the lamp, by heat, and then flattened the glass down upon the wires to form the seal. I have in some cases found this to be disadvantageous, because the glass is pressed down in one direction only upon the wires, and on the sides where the glass is not pressed down the glass and wires might be slightly separated, which would impair the seal. I remedy this by molding the glass firmly and closely about each wire, pressing it upon them in all directions. After flattening the glass down on the wires, as above set forth, I slit the flat portion thus formed down its middle with a suitable tool, the glass being still in a soft condition. I then press and mold each separate portion of glass thus formed upon one of the wires, thereby forming a compact, secure, and durable seal. I may, if desired, bend the solid-glass projections thus formed out from each other, so as to bring their ends into line with the ends of the carbon filament, whereby less copper wire is required within the lamp.

Figure 1:
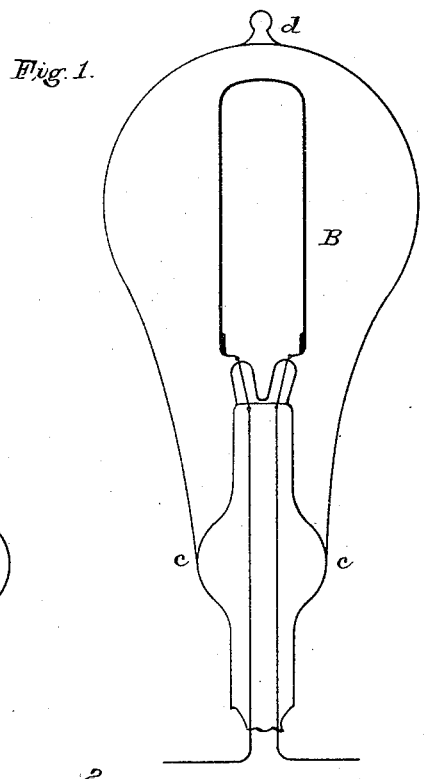
Figure 5:
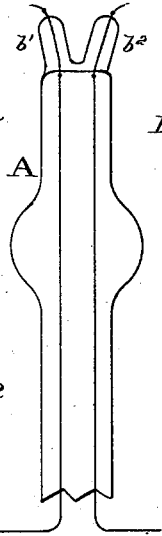
Figure 6:
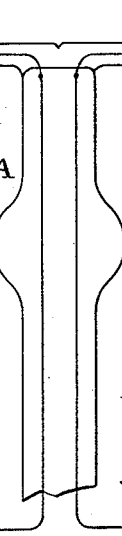
Figure 7:
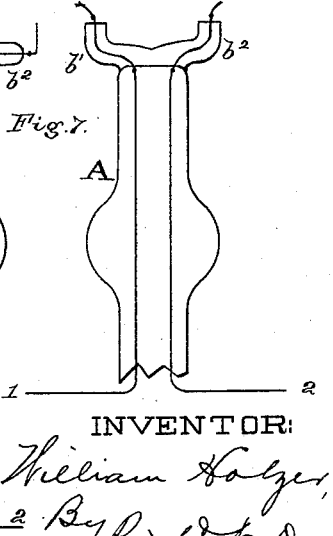

My invention is illustrated in the annexed drawings, in which Figure 1 is a view of a completed lamp embodying my invention. Figs. 2, 3, 4, and 5 illustrate the various stages in the formation of the inner stem, and Figs. 6 and 7 represent modifications of the invention.

Figure 2:
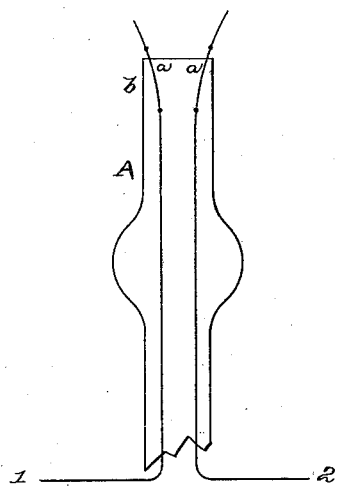
Figure 3:
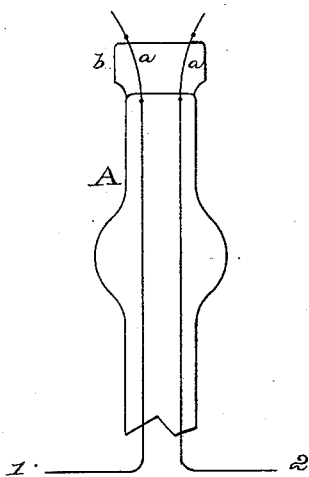
Figure 4:
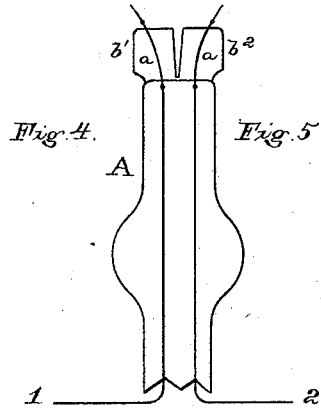

In Fig. 2, A represents the tube for the stem of the lamp. The leading-in wires 1 2 are laid within it, the portions $a$ $a$ of such wires being of platinum. The upper end, $b$, of the tube is softened by the application of heat, and is then pressed or flattened down upon the wires, forming the flat portion shown in Fig. 3. This flat portion is then split or divided by a pair of scissors, as in Fig. 4, and the two parts $b'$ $b^2$ are pressed and molded upon the wires, forming two solid projections, as seen in Fig. 5. The flexible carbon filament B is then attached to the leading-in wires. The stem A is sealed to the globe C at $c$ $c$. Said globe is exhausted and sealed off at $d$, the completed lamp being as represented in Fig. 1. The projections $b'$ $b^2$ may, however, be bent out straight from each other, as in Fig. 6, or bent out and up, as in Fig. 7. This brings the glass close to the ends of the filament, diminishing the amount of copper required within the lamp.

What I claim is—

1. The method of manufacturing incandescent electric lamps, consisting in dividing the upper end of the stem into two parts and molding each part upon one of the leading-in wires, substantially as set forth.

2. The method of manufacturing incandescent electric lamps, consisting in softening by heat the end of the tube in which the wires are laid, flattening such end upon said wires, dividing such flat portion into two parts, and molding each part upon one of the leading-in wires, substantially as set forth.

3. The method of manufacturing incandescent electric lamps, consisting in dividing the end of the inner stem into two parts, molding each of such parts upon one of the leading-in wires, and then bending such parts away from each other, substantially as set forth.

This specification signed and witnessed this 21st day of March, 1883.

WILLIAM HOLZER.

Witnesses:
H. W. SEELY,
THOMAS H. HOWELL.